United States Patent Office 3,294,477
Patented Dec. 27, 1966

3,294,477
PROCESS FOR THE CONTINUOUS COLORING OF SILK, WOOL AND/OR SYNTHETIC POLYAMIDE FIBRES OR MATERIALS CONTAINING SUCH FIBRES
Ergun Tamer, Bergisch-Neukirchen, Otto Schneider, Cologne-Flittard, and Mathieu Quaedvlieg, Leverkusen, Germany, assignors to Farbenfabriken Bayer Aktiengesellschaft, Leverkusen, Germany, a German corporation
No Drawing. Filed July 30, 1963, Ser. No. 298,576
Claims priority, application Germany, Aug 4, 1962, F 37,522; Mar. 29, 1963, F 39,354
4 Claims. (Cl. 8—85)

The object of the present invention is a process for the continuous coloring, i.e. dyeing, pad-dyeing and printing, of silk, wool and/or synthetic polyamide fibres or materials containing such fibres, with dyestuffs suitable for coloring silk, wool or synthetic polyamide fibres; the process consists in contacting the fibrous materials with an aqueous emulsion which results when the dyestuffs are dispersed in water (a) in the presence of carboxylic acids containing at least one nitrogen atom and a hydrocarbon radical with at least 8 carbon atoms linked via a —CO— or —SO$_2$— bridge with a nitrogen atom, or (b) in the presence of salts of such carboxylic acids, whereupon the preparation is acidified, expediently with lower aliphatic carboxylic acids, such as formic acid, acetic acid, lactic acid, oxalic acid, tartaric acid and citric acid, and the fibrous materials are subsequently subjected to the action of heat in a steam atmosphere, for example on a steamer or in a heating chamber.

Among the nitrogen-containing carboxylic acids employed according to the present invention, are particularly included compounds having the general formula

wherein R represents an alkyl, cycloalkyl, aryl, alkylaryl or arylalkyl radical with at least 8 carbon atoms and optionally interrupted by hetero atoms or by groups containing heteroatoms, X represents one of the radicals —CO— or —SO$_2$—; and R$_1$ is hydrogen or a lower alkyl radical, optionally substituted, e.g. by a hydroxyl or carboxyl group; Y is defined as a lower alkylene radical which may be substituted, e.g. directly or via an alkylene radical, by a hydroxyl group, an amino group, a carboxyl group or a carboxylic acid amide group, or defined as the grouping

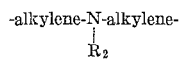

wherein R$_2$ is hydrogen or a lower alkylene radical optionally substituted e.g. by a hydroxyl group, an amino group or a carboxyl group.

Representative examples of the nitrogen-containing carboxylic acids include the following: the substances obtained by reacting aminoacetic acid methyl- or butyl-aminoacetic acid, glutamine, blutamic acid, asparagine, aspartic acid, or the aminocarboxylic acid mixtures occurring in the hydrolytic decomposition of protein-containing substances, with higher fatty acid chlorides or higher alkyl sulphochlorides; the substances obtained by reacting lower haloalkyl carboxylic acids such as e.g. chloro-acetic acid or bromobutyric acid, with higher fatty acidamides or higher alkyl sulphamides; and the substances obtained by reacting alkylene diamines with higher fatty acids and lower haloalkyl carboxylic acids, for example according to the process of U.S. patent specification No. 2,993,918.

As salts of nitrogen containing carboxylic acids the alkali metal salts and the alkylolamine salts are primarily suitable.

As dyestuffs, alizarin dyestuffs, azo dyestuffs, metal complex dyestuffs and chrome dyestuffs, for example, are to be considered. The dispersion of the dyestuffs in the aqueous medium is expediently brought about by heating to about 70–80° C. with strong stirring.

The resulting dyeings or prints can be further improved in many cases by the concurrent use of organic solvents, which posses a good solvent capacity for the dyestuff used. Examples of such solvents are butanol, hexanol, 2-ethyl hexanol, cyclohexanol, benzyl alcohol, acetic acid butyl ester and the monoethyl ethers or the monobutyl ethers of ethylene glycol or diethylene glycol.

It is furthermore recommended to stabilise the emulsions by adding thickening agents, for example sodium alginate or etherified carob bean flour.

The proportions by weight between the components of the aqueous emulsions to be used according to the invention may vary within wide limits. Suitable proportions may readily be determined for each case by preliminary experiments. It has proved expedient to employ a content of nitrogen-containing carboxylic acids or their salts in the emulsions amounting to at least 10 g. per litre.

With the aid of the present invention it is possible to dye or print silk, wool and/or synthetic polyamide fibres or materials containing such fibres, with dyestuffs suitable for coloring silk, wool or synthetic fibres, in a continuous and outstanding manner, even when dyestuffs are used which possess a high proportion of electrolyte-containing standardizing agents. The process is especially useful in that no damage occurs to the fibres so treated.

The following examples serve to illustrate the invention without, however, limiting its scope; the parts given are parts by weight.

Example 1

500 parts of soft water at 70–80° C. are poured over 40 parts of the 2:1 chromium complex of the monoazo dyestuff anthranilic acid → 1-phenyl-3-methyl-pyrazolone; 20 parts of the monoethanolamine salt of lauric acid sarcoside are then added. The mixture is heated to 80–90° C. and added with vigorous stirring, e.g. with a high speed electric stirrer, to 120 parts of a 5% aqueous solution of an etherified carob bean meal. The homogeneous solution is then mixed slowly and with strong stirring with a solution of 8 parts of glacial acetic acid in 100 parts of water. The resulting emulsion is then made up to 1000 parts with soft water.

With this bath, wool worsted goods are padded on the foulard, to an increase of weight of about 70%, and steamed for 15 minutes in a steamer with saturated steam at 102–103° C. The goods are then washed at 50–60° C. for a few minutes in an aqueous solution which contains 1 g. per litre of a commercial anion-active detergent, and rinsed with cold water. An outstanding yellow dyeing is obtained.

Example 2

500 parts of soft water at 70–80° C. are poured over 40 parts of the disazo dyestuff 4,4'-(o-aminobenzenesulphonyloxy)-diphenyl-dimethylmethane⇌2 mol 1-(3'-sulphophenyl)-3-methyl-5-aminopyrazole, and 20 parts of the monoethanolamine salt of lauric acid sarcoside and 10 parts of cyclohexanol are then added. The mixture is heated to 80–90° C. and then added with strong stirring to 120 parts of a 5% aqueous solution of an etherified carob bean meal. A solution of 8 parts of glacial acetic acid in 100 parts of water is thereupon added to the homogeneous solution, slowly and with strong stirring. The resulting emulsion is subsequently made up with soft water to 1000 parts.

With this bath, wool gabardine is padded on the foulard, to an increase of weight of about 70%, and then rolled up. The roll is then turned for 4 hours in a heated chamber at 100–102° C. in a steam atmosphere. The wool material is then washed and rinsed as described in Example 1. A vivid yellow dyeing is obtained.

Example 3

500 parts of hot soft water at 70–80° C. are poured over 40 parts of the 2:1 chromium complex of the monoazo dyestuff 1-hydroxy-2-aminobenzene-5-sulphodimethylamide→1-phenyl-3-methyl pyrazolone, and then 20 parts of the monoethanolamine salt of oleic acid sarcoside and 6 parts of butanol are added. The mixture is heated to 80–90° C. and then added to 200 parts of a 2.5% aqueous solution of sodium alginate. The homogeneous solution prepared by vigorous stirring is then mixed slowly and with further stirring with a solution of 10 parts of glacial acetic acid in 100 parts of water. The resulting emulsion is finally made up with soft water to 1000 parts.

Wool worsted goods are padded with this bath on the foulard to an increase of weight of about 70%, then steamed, washed and rinsed. A very good red dyeing is obtained.

Example 4

500 parts of hot soft water at 70–80° C. are poured over 40 parts of the 2:1 chromium complex dyestuff set forth in Example 3, 20 parts of the diethanolamine salt of stearic acid sarcoside and 10 parts of benzyl alcohol are then added. The mixture is heated to about 90° C. and then added to 200 parts of a 2.5% aqueous sodium alginate solution. The homogeneous solution prepared by strong stirring is thereupon mixed slowly and with further stirring with a solution of 10 parts of glacial acetic acid in 100 parts of water. The resulting emulsion is then made up with soft water to 1000 parts. Wool gabardine is padded with this bath on the foulard to an increase of weight of about 70%, and rolled up. The roll is turned for four hours in a heated chamber at 100–102° C. The wool material is then washed and rinsed as described in Example 1. An outstanding red dyeing is again obtained.

Example 5

500 parts of hot soft water at 70–80° C. are poured over 40 parts of the chromium complex dyestuff specified in Example 3, and 20 parts of the monoethanolamine salt of oleic acid sarcoside and 10 parts of acetic acid butyl ester are then added. The mixture is heated to about 90° C. and then added with strong stirring to 120 parts of a 5% solution of an etherified carob bean meal. The homogeneous solution prepared by strong stirring is then mixed slowly and with further stirring with a solution of 16 parts of 85% formic acid in 100 parts of water. The resulting emulsion is then made up to 1000 parts with soft water.

Wool worsted goods are padded with this bath on the foulard, to an increase of weight of about 70%, and then steamed for 15 minutes in a steamer with saturated steam at 102–103° C. The worsted goods are then washed and rinsed. An outstanding red dyeing is again obtained.

Example 6

500 parts of hot soft water at 70–80° C. are poured over 30 parts of the dyestuff according to Colour Index (2nd edition) No. 62,045, and 20 parts of the monoethanolamine salt of lauric acid sarcoside and 10 parts of benzyl alcohol are added. The mixture is heated to about 90° C. and then added with strong stirring to 120 parts of a 5% solution of an etherified carob bean meal. The homogeneous solution thus prepared is then mixed slowly and with further stirring with a solution of 10 parts of glacial acetic acid in 100 parts of water. The resulting emulsion is made up with soft water to 1000 parts.

Ski gabardine of equal parts wool and ruffled polyamide is padded with this bath on the foulard, to an increase of weight of about 70%, and rolled up. The roll is then turned for 4 hours in a heated chamber at 100–102° C. The fabric is thereafter washed and rinsed. A brilliant blue dyeing is obtained.

Example 7

500 parts of hot soft water at 70–80° C. are poured over 30 parts of the dyestuff according to Colour Index (2nd edition) No. 19,360, and then 18 parts of the monoethanolamine salt of lauric acid sarcoside, 6 parts of the monoethanolamine salt of oleic acid sarcoside and 6 parts of benzyl alcohol are added. The mixture is heated to about 90° C. and added with strong stirring to 200 parts of a 5% aqueous solution of an etherified carob bean meal. The homogeneous solution is then mixed with a solution of 10 parts of crystallised oxalic acid and 10 parts of glacial acetic acid in 100 parts of water. The resulting emulsion is cooled to about 40–50° C. and mixed with a solution of 40 parts chromium fluoride in 100 parts of water. The emulsion is then made up to 1000 parts with soft water.

Wool worsted goods are printed with the bath on a Vigoureux printing machine (rolls 50:50) and then steamed for an hour in a steamer with saturated steam at 102 to 103° C. The worsted goods are then washed and rinsed. An outstanding bordo shade is obtained.

Example 8

500 parts of hot soft water are poured over 70 parts of the 2:1 chromium complex of the dyestuff obtained by mixed chroming of the monoazodyestuff 4-nitro-2-aminophenyl→1-methylsulphonylamino-7-naphthol and the monoazo dyestuff 1-aminophenol-4-sulphonamide→β-naphthol, and then 23 parts of the monoethanolamine salt of lauric acid sarcoside, 7 parts of the monoethanolamine salt of oleic acid sarcoside, 30 parts of benzyl alcohol and 40 parts of thiourea are added. The mixture is then heated to about 90° C. and with strong stirring added to 120 parts of a 5% aqueous solution of an etherified carob bean meal. The homogeneous solution is thereupon mixed slowly and with further stirring with a solution of 6 parts of 85% formic acid in 100 parts of water. The resulting emulsion is then made up to 1000 parts with soft water.

Wool worsted goods are printed with the bath on a Vigoureux printing machine (rolls 70:30) and steamed for 40 minutes in a steamer with saturated steam at 102–103° C. Finally the worsted goods are washed and rinsed. A deep black shade is obtained.

Example 9

500 parts of hot soft water are poured over 100 parts of the dyestuff according to Colour Index (2nd edition) No. 26,370, and then 45 parts of the monoethanolamine salt of lauric acid sarcoside and 15 parts of benzyl alcohol are added. The mixture is heated to about 90° C. and then added to 120 parts of a 5% aqueous solution of an etherified carob bean meal, with strong stirring. The homogeneous solution is then mixed slowly and with strong stirring with a solution of 8 parts of glacial acetic acid in 100 parts of water. The resulting emulsion is then made up with soft water to 1000 parts, 10 parts of sodium chlorate being added to protect the dyestuff against reductive action in the heat treatment.

Ski gabardine of equal parts of wool and ruffled polyamide are padded with this bath on the foulard to an increase of weight of about 70% and rolled up. The roll is turned in a heated chamber for 4 hours at 100–102° C. The fabric is then washed and rinsed. A deep black dyeing is obtained.

Example 10

Over 30 parts of the 2:1 chromium complex of the monoazo dyestuff 1-hydroxy-2-aminobenzene-5-sulphodimethylamide→1-phenyl-3-methyl-pyrazolone, 400 parts of hot soft water are poured at about 80° C.; 15 parts of the monoethanolamine salt of lauric acid sarcoside, 5 parts of the monoethanolamine salt of oleic acid sarcoside and 5 parts of cyclohexanol are subsequently added. The mixture is added with strong stirring to 350 parts of a 5% aqueous solution of carob bean meal. The homogeneous solution is then mixed with 30 parts of a 30% acetic acid and the resulting emulsion is made up to 1000 parts with soft water.

With this dye paste, silk fabric is printed, dried and steamed at 102–103° C. for 20 minutes with saturated steam in a steamer, then washed and rinsed. An outstanding red print is obtained.

*Example 11*

Over 25 parts of the diazo dyestuff 4,4'-(o-amino-benzene-sulphonyl-hydroxy)-diphenyl-dimethylmethane⇌2 mol 1-(3'-sulphophenyl)-3-methyl-5-aminopyrazole, 400 parts of soft water at about 80° C. are poured; 20 parts of the monoethanolamine salt of lauric acid sarcoside are then added. The mixture is introduced with strong stirring into 150 parts of a 5% aqueous solution of carob bean meal. The homogeneous solution is then mixed with 40 parts of 30% acetic acid and the resulting emulsion is made up with soft water to 1000 parts.

Silk fabric is padded with this liquor on the foulard, whereby the take-up weight amounts to about 70%, and rolled up. The roll is kept in a heated chamber for 4 hours at about 100° C. The silk fabric is then washed and rinsed. An excellent yellow dyeing is obtained.

*Example 12*

Over 20 parts of the dyestuff according to the Colour Index (2nd edition) No. 19,360, 400 parts of hot soft water are poured at 80° C.; 15 parts of the diethanolamine salt of stearic acid sarcoside and 5 parts of butanol are then added. The mixture is then introduced with strong stirring into 400 parts of a 5% aqueous solution of carob bean meal. The homogeneous solution is then mixed with 15 parts of 80% lactic acid. The resulting emulsion is cooled to about 40° C. and, after addition of 30 parts of chromium fluoride, made up to 1000 parts with soft water.

With this dye paste, silk fabric is printed, dried and then steamed for 1 hour in a steamer with saturated steam at 102–103° C. The fabric is then washed and rinsed. An outstanding bordo shade is obtained.

We claim:
1. A process for the continuous coloring of fibrous material containing at least one member selected from the group consisting of silk, wool and synthetic polyamide, comprising padding or printing the fibrous material with an acidified aqueous emulsion comprising
   (a) a dyestuff,
   (b) at least 10 grams per liter of a compound selected from the group consisting of
      (1) a nitrogen-containing carboxylic acid of the formula

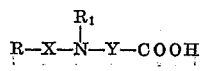

wherein
   R is a member selected from the group consisting of saturated and unsaturated aliphatic hydrocarbon radicals containing at least 8 carbon atoms wherein
   X is a member selected from the group consisting of —CO— and —SO$_2$—;
   R$_1$ is a member selected from the group consisting of hydrogen, lower alkyl, hydroxy lower alkyl, and carboxy lower alkyl;
   Y is a member selected from the group consisting of lower alkylene, hydroxy lower alkylene, amino-substituted lower alkylene, carboxy-substituted lower alkylene, an amide-substituted lower alkylene and

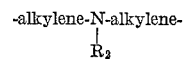

wherein
   R$_2$ is a member selected from the group consisting of hydrogen, lower alkylene, hydroxy lower alkylene, amino-substituted alkylene and carboxy-substituted alkylene and
   (2) the corresponding alkali or alkylolamine salts thereof, and
   (c) a thickening agent; and thereafter exposing the fibrous material to the action of heat in a steam atmosphere.
2. A process according to claim 1 wherein the nitrogen-containing carboxylic acid is a member of the group consisting of lauric acid sarcoside, stearic acid sarcoside and oleic acid sarcoside.
3. The process of claim 1 wherein the dyestuff is a member selected from the group consisting of an alizarin dyestuff, a mono azo dyestuff, and a disazo dyestuff and the corresponding metal complexes.
4. The dyed material obtained according to the process of claim 1.

References Cited by the Examiner

UNITED STATES PATENTS

| 2,047,069 | 7/1936 | Hentrich et al. | 8—85 |
| 3,083,069 | 3/1963 | Hirsbrunner et al. | 8—54 |
| 3,150,916 | 9/1964 | Karacsonyi | 8—54 |

OTHER REFERENCES

Colour Index, First ed., January 1929, page 93, CI No. 370.

Colour Index, Second ed. 1956, vol. 2, page 2076, CI No. 23,500.

NORMAN G. TORCHIN, *Primary Examiner.*

J. T. BROWN, T. J. HERBERT, *Assistant Examiners.*